United States Patent
Xu (10) Patent No.: US 8,582,488 B2
(45) Date of Patent: Nov. 12, 2013

(54) ACQUIRING METHOD, ACQUIRING APPARATUS AND USER EQUIPMENT FOR MULTICAST CONTROL CHANNELS (MCCHS) INFORMATION

(75) Inventor: Hui Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,309

(22) PCT Filed: Jun. 13, 2010

(86) PCT No.: PCT/CN2010/073980
§ 371 (c)(1),
(2), (4) Date: Jul. 11, 2012

(87) PCT Pub. No.: WO2011/097855
PCT Pub. Date: Aug. 18, 2011

(65) Prior Publication Data
US 2012/0314642 A1 Dec. 13, 2012

(30) Foreign Application Priority Data
Feb. 11, 2010 (CN) .......................... 2010 1 0111946

(51) Int. Cl.
*H04H 20/71* (2008.01)

(52) U.S. Cl.
USPC ........... 370/312; 370/252; 370/311; 370/319; 370/328; 455/3.01; 455/3.05; 455/404.1; 455/434; 455/522

(58) Field of Classification Search
USPC ......... 370/252, 253, 311, 312, 319, 320, 328; 455/3.01–3.05, 404.1, 434, 522
See application file for complete search history.

(56) References Cited

U.S. PATENT DOCUMENTS

| 7,499,435 | B2 | 3/2009 | Kwak |
| 7,924,760 | B2 * | 4/2011 | Ding et al. ............... 370/312 |
| 8,000,292 | B2 * | 8/2011 | Cai et al. .................. 370/329 |
| 8,064,942 | B2 * | 11/2011 | Yang et al. ................ 455/518 |

(Continued)

FOREIGN PATENT DOCUMENTS

| CN | 101262626 A | 9/2008 |
| CN | 101552950 A | 10/2009 |
| WO | 2006036050 A1 | 4/2006 |
| WO | 2008035880 A1 | 3/2008 |

OTHER PUBLICATIONS

International Search Report in international application No. PCT/CN2010/073980, mailed on Nov. 18, 2010.

(Continued)

*Primary Examiner* — Andrew Lai
*Assistant Examiner* — Andrew C Lee
(74) *Attorney, Agent, or Firm* — Oppedahl Patent Law Firm LLC (57) ABSTRACT

The present disclosure discloses a method for acquiring Multicast Control Channel (MCCH) information, which includes that: in a Multimedia Broadcast Single Frequency Network (MBSFN) area which includes more than two MCCHs, when User Equipment (UE) detects that a interested MBMS service is started, the UE further determines whether a correspondence relationship between the interested MBMS service and the MCCHs exists, and the UE only acquires MCCH information corresponding to the interested MBMS service when the correspondence relationship exists, otherwise the UE acquires all MCCH information in the MBSFN area. The disclosure further discloses an apparatus and UE for acquiring MCCH information. It is ensured that UE in an overlapped MBSFN area receives a presently started MBMS service in time.

10 Claims, 5 Drawing Sheets

(56) References Cited

U.S. PATENT DOCUMENTS

| | | | |
|---|---|---|---|
| 8,077,649 B2* | 12/2011 | Cai | 370/312 |
| 8,139,524 B2* | 3/2012 | Lee et al. | 370/328 |
| 8,155,648 B2* | 4/2012 | Lee et al. | 455/434 |
| 8,223,689 B2* | 7/2012 | Fischer | 370/328 |
| 8,265,039 B2* | 9/2012 | Reza et al. | 370/332 |
| 8,351,974 B2* | 1/2013 | Ahn et al. | 455/522 |
| 8,363,585 B2* | 1/2013 | Bouazizi | 370/312 |
| 8,369,286 B2* | 2/2013 | Hamabe et al. | 370/332 |
| 2006/0030342 A1* | 2/2006 | Hwang et al. | 455/466 |
| 2006/0067281 A1 | 3/2006 | Kwak | |
| 2008/0049682 A1* | 2/2008 | Ding et al. | 370/335 |
| 2008/0268878 A1* | 10/2008 | Wang et al. | 455/458 |
| 2009/0046617 A1* | 2/2009 | Tenny et al. | 370/312 |
| 2009/0122740 A1* | 5/2009 | Bouazizi | 370/312 |
| 2009/0238091 A1* | 9/2009 | Kim et al. | 370/252 |
| 2009/0264064 A1 | 10/2009 | Hyun | |
| 2009/0323574 A1* | 12/2009 | Koskinen et al. | 370/312 |
| 2010/0128646 A1* | 5/2010 | Gao | 370/312 |
| 2010/0174809 A1* | 7/2010 | Chun et al. | 709/221 |
| 2010/0178895 A1* | 7/2010 | Maeda et al. | 455/404.1 |
| 2010/0189027 A1* | 7/2010 | Ishida et al. | 370/312 |

OTHER PUBLICATIONS

English Translation of the Written Opinion of the International Search Authority in international application No. PCT/CN2010/073980, mailed on Nov. 18, 2010.

Evolved Universal Terrestrial Radio Access Network May 31, 2008.

The MCCH Reception of LTE R9 UE in Overlapping Areas Jun. 23, 2009.

E-mail discussion on multiple MBSFN support Oct. 5, 2009.

Overall description Jan. 7, 2010.

Supplementary European Search Report in European application No. 10845527.0, mailed on Dec. 18, 2012.

* cited by examiner

ACQUIRING METHOD, ACQUIRING APPARATUS AND USER EQUIPMENT FOR MULTICAST CONTROL CHANNELS (MCCHS) INFORMATION

TECHNICAL FIELD

The disclosure relates to an acquisition technology of Multimedia Broadcast Multicast Service (MBMS) control channel information, and in particular to a method, an apparatus and User Equipment (UE) for acquiring MBMS control channel information in a Long Term Evolution (LTE) system.

BACKGROUND

In order to utilize mobile network resource effectively, a 3rd Generation Partnership Project (3GPP) proposes an MBMS which provides a data source configured to sending a point-to-multipoint service of data to multiple users in a mobile network so as to realize network resource sharing and improve an utilization ratio of network resource, particularly precious air interface resource. In the LTE system, an MBMS technology is called an Evolved MBMS (E-MBMS).

In an existing LTE network, a logical channel of an MBMS service is a Multicast Traffic Channel (MTCH); each MTCH corresponds to a session of an MBMS. Multiple MTCHs can be mapped to the same transmission Multimedia Channel (MCH); one or more MCHs can be mapped to the same Physical Multicast Channel (PMCH); and one PMCH consists of a group of Multicast Broadcast Single Frequency Network (MBSFN) subframes.

In an existing LTE network, a concept of an MBSFN area is introduced; in one MBSFN area, the MBMS service is sent by using an MBSFN mode; in the same MBSFN area, different cells send identical physical signals synchronously by using the same resource, content and time to realize a diversity receiving gain of a receiving terminal. In one MBSFN area, one or more PMCHs can be configured, wherein one PMCH can bear one or more MCHs, preferably, one PMCH bears one MCH. In the LTE network, UE is informed that one MBMS service will be changed including session start, service bearer update or session stop and the like, and that Downlink Control Information (DCI) and an MBMS-Radio Network Temporary Identifier (M-RNTI) can be sent on a Physical Downlink Control Channel (PDCCH) at first. The UE further acquires a specific Multicast Control Channel (MCCH) message according to related information in the DCI, which is called an MCCH notification mechanism. In the related art of a 3GPP Release9, a resource configuration of MCCH notification information is provided in a System Information Block13 (SIB13), the resource configuration including an MCCH notification repetition coefficient (notificationRepetitionCoeff), a notification frame offset (notificationOffset) and a notification subframe location (notification-subframe).

The logical channel MCCH is an MCCH which bears configuration information of each MCH/PMCH in one MBSFN area, the configuration information including an MBSFN subframe configuration, a modulation encoding solution and the like configured by each PMCH. In the related art, an one-to-one relationship is between the MCCH and the MBSFN area.

The MCCH further bears configuration information of one service including identifier information, session identifier information, state information, Logical Channel Identity (ID) (LCID) information and the like of one service in an MBSDN area. After acquiring information of one specific service by acquiring one MCCH, the UE starts to receive data of the service on one MTCH. The configuration information of one MCCH channel is sent in form of a system message on a Broadcast Control Channel (BCCH); if multiple MCCHs exist, each MCCH corresponds to a group of configuration information in broadcast information.

After entering into one MBSFN cell, the UE will acquire messages of the BCCH and MCCH to acquire the configuration information of the MBMS service and then receive interested service on the MTCH; in the related art, after entering into one MBSFN cell, the UE will acquire all MCCHs in the cell and then find whether an MBMS service expected to be received is started; if the MBMS service interested by the UE is not started, the UE will monitor the MCCH notification information; when the MCCH notification information (MCCH change notification) is detected, it is indicated that the MCCH will be changed during the next MCCH modification period; in the related art, the MCCH notification information is only aiming at a session start event, that is, only the session start event will trigger a system side to send the MCCH notification information.

In the study and practice processes of the related art, it is found the following problem: UE having a capability of acquiring an MBMS service is located in an overlapped MBSFN area in which there is an MBMS service the UE is interested in acquiring and the UE is interested to monitor MCCH notification information the related art, if the interested MBMS service is started, the UE can not monitor the corresponding MCCH notification information and thus might miss the reception of the MBMS service.

SUMMARY

In view of the problem above, the main purpose of the present disclosure is to provide a method, an apparatus, User Equipment (UE) for acquiring Multicast Control Channel (MCCH) information, capable of acquiring MCCH information corresponding to Multimedia Broadcast Multicast Service (MBMS) service which is started and interested by the UE, thereby guaranteeing that the MBMS service interested by the UE is correctly received.

In order to achieve the purpose above, the technical solution of the disclosure is realized as follows.

A method for acquiring MCCH information, which includes that:

in a Multimedia Broadcast Single Frequency Network (MBSFN) area which includes more than two MCCHs of an MBMS service, when UE detects that an interested MBMS service is started, the UE further determines whether a correspondence relationship between the interested MBMS service and the MCCHs exists, and the UE only acquires the MCCH information corresponding to the interested MBMS service when the correspondence relationship exists, otherwise, the UE acquires all MCCH information in the MBSFN area.

Preferably, when the UE determines that a correspondence relationship between the interested MBMS service and the MCCHs exists, the method may further include that:

the UE determines configuration information of the interested MBMS service according to the acquired MCCH information corresponding to the interested MBMS service, and receives the interested MBMS service according to the configuration information.

Preferably, when the UE determines that a correspondence relationship between the interested MBMS service and the MCCHs does not exist, the method may further include that:

the UE finds out configuration information of the interested MBMS service according to all the acquired MCCH information, and receives the interested MBMS service according to the configuration information.

Preferably, the MBSFN area may include more than two MCCHs, that is, the MBSFN area is located in an overlapped area where more than two MBSFN areas are overlapped.

Preferably, that the UE determines whether a correspondence relationship between the interested MBMS service and the MCCHs exists may include that:

the UE acquires a correspondence relationship between an MBMS service and an MCCH according to at least one of received Electronic Service Navigation (ESG), MCCH information, a short message, a multimedia short message, a system message, Radio Resource Control (RRC) information and MCCH notification information, and the UE further determines whether the interested MBMS service has a corresponding MCCH.

Preferably, the UE may be UE in RRC_IDLE state or RRC_CONNECTED state; and the UE may be UE which is receiving an MBMS service or is interested in receiving an MBMS service.

An apparatus for acquiring Multicast Control Channel (MCCH) information is provided, which includes a first determination unit, a first acquiring unit and a second acquiring unit, wherein the first determination unit is configured to, in a Multimedia Broadcast Single Frequency Network (MBSFN) area which includes more than two Multicast Control Channels (MCCHs), when detecting that an MBMS service interested by User Equipment (UE) is started, further determine whether a correspondence relationship between the interested MBMS service and the MCCHs exists, and trigger the first acquiring unit when the correspondence relationship exists, otherwise, trigger the second acquiring unit;

the first acquiring unit is configured to only acquire the MCCH information corresponding to the interested MBMS service;

the second acquiring unit is configured to acquire all MCCH information in the MBSFN area.

Preferably, the apparatus may further include a second determination unit and a first receiving unit, wherein the second determination unit may be configured to determine configuration information of the interested MBMS service according to the MCCH information corresponding to the interested MBMS service acquired by the first acquiring unit;

the first receiving unit may be configured to receive the interested MBMS service according to the configuration information.

Preferably, the apparatus may further include a finding unit and a second receiving unit, wherein the finding unit may be configured to find out configuration information of the interested MBMS service according to all the MCCH information acquired by the second acquiring unit;

the second receiving unit may be configured to receive the interested MBMS service according to the configuration information.

Preferably, the MBSFN area may include more than two MCCHs, that is, the MBSFN area may be located in an overlapped area where more than two MBSFN areas are overlapped.

Preferably, the first determination unit may be configured to acquire a correspondence relationship between an MBMS service and an MCCH according to at least one of Electronic Service Navigation (ESG), MCCH information, a short message, a multimedia short message, a system message, Radio Resource Control (RRC) information and MCCH notification information received by the UE, and further to determine whether the interested MBMS service has a corresponding MCCH.

UE having a capability of acquiring Multimedia Broadcast Multicast Service (MBMS) includes the acquiring apparatus forementioned.

In the present disclosure, in an MBSFN area which includes more than two MCCHs, it is determined that whether a correspondence relationship between an MBMS service interested by UE and an MCCH is determined currently, MCCH information corresponding to the MBMS service interested is only acquired when the correspondence relationship is determined, otherwise, all MCCH information in the MBSFN area are monitored to acquire configuration information of the MBMS service interested by the UE, such that the reception of the service is accomplished. The disclosure ensures that UE in an overlapped MBSFN area receives an MBMS service presently started in time.

DETAILED DESCRIPTION

The basic idea of the disclosure is that: in an MBSFN area which includes more than two MCCHs, it is determined that whether a correspondence relationship between an MBMS service interested by UE and an MCCH is determined currently, MCCH information corresponding to the MBMS service interested is only acquired when the correspondence relationship is determined, otherwise, all MCCH information in the MBSFN area are monitored to acquire configuration information of the MBMS service interested by the UE, such that the reception of the service is accomplished.

In order to make the purpose, technical solution and advantages of the present disclosure more clear and understood, the disclosure will be further described in detail by means of embodiments with reference to the accompanying drawings hereinafter.

The disclosure provides a method for acquiring MCCH information by UE according to a currently interested service in an MBSFN overlapped area, thereby guaranteeing that an MBMS service is normally received by the UE in the MBSFN overlapped area.

When a cell is covered by more than two MBSFNs, a network side will configure a corresponding MCCH for each MBSFN area in the cell; one MCCH corresponds to one MBSFN area, bears configuration information of an MBMS service sent from the corresponding MBSFN area and sends configuration information of MCCH notification information in a system message.

The method provided by the disclosure further includes the following steps.

Step 1: a system side sends information related to an MBMS service of the overlapped MBSFN area to UE.

Step 2: the UE receives the information above related to an MBMS service, and determines that an MBMS service (interested MBMS service) the UE expects to receive is started and further determines whether a correspondence relationship between the MBMS service expected to be received and an MCCH is contained in the information related, if the correspondence relationship is contained, the UE acquires MCCH information corresponding to the MBMS service interested, if the correspondence relationship is not contained, the UE acquires all MCCH information in the area.

In Step 1 above, an apparatus for sending the information related to an MBMS service to the UE might be a Bbroadcast Multicast Service Centre (BM-SC), or a Mobile Management Entity (MME), or an MBMS GateWay (MBMS-GW), or a Multicast Coordination Entity (MCE), or an evolved NodeB (eNB), or other network element, wherein the MCE is a logical entity which can either exist independently or exist as one part of another network element, such as one part of the eNB; the eNB above can further be a relay or a Home eNodeB (HeNB).

The overlapped MBSFN area in the disclosure is a static area, that is, the MBSFN area is configured in a semi-static mode by an Operation & Management (O&M) and keeps unchanged during a sending process of the MBMS service, or the overlapped MBSFN area is an MBSFN dynamic area; the overlapped area can be partially overlapped or completely overlapped; the MBSFN area can be indicated by an MBSFN area ID.

The information related to an MBMS service mentioned in Step 1 can be sent to the UE through at least one of following messages: Electronic Service Navigation (ESG), MCCH information, a short message, a multimedia short message, a system message, Radio Resource Control (RRC) information; the information above related to an MBMS service can be sent periodically and triggered based on an event, for example, the information related to an MBMS service is sent when being changed; wherein a sending period is notified to the UE through a system message. The information above related to an MBMS service include but not limited to one or more of following contents: an MBMS service identifier in an area, a correspondence relationship between an MBMS service and an MCCH in an area, an MBMS service state in an area, start time of an MBMS service in an area, duration time of an MBMS service in an area, end time of an MBMS service in an area, priority information of an MBMS service in an area, charging information of an MBMS service in an area, classification information of an MBMS service in an area and the like.

UE in the disclosure refers to UE which enters into an MBSFN area and has a capability of acquiring an MBMS service; the UE above can be located in RRC_IDLE state or RCC_CONNECTED state, and the UEs might be acquiring an MBMS service or be interested in acquiring an MBMS service.

The UE detects that the MBMS service interested is started according to the information related to an MBMS service in Step 1 and the MCCH information stored, wherein the MCCH information is information stored related to an MBMS service in the MCCH after the UE acquires MCCH information.

The UE acquires the MCCH information corresponding to the MBMS service interested, obtains the configuration information of the MBMS service interested from the MCCH information and realizes the reception of the MBMS service interested; after acquiring all MCCH information in the MBSFN area, the UE finds out the configuration information of the MBMS service interested from all the acquired MCCH information to realize the reception of the MBMS service interested.

In the disclosure, if the UE has no need to receive the MBMS service in the MBSFN area above, it is not necessary to receive the MCCH information.

The essence of the technical solution of the disclosure will be further illustrated through specific examples hereinafter.

EXAMPLE 1

Figure 1:
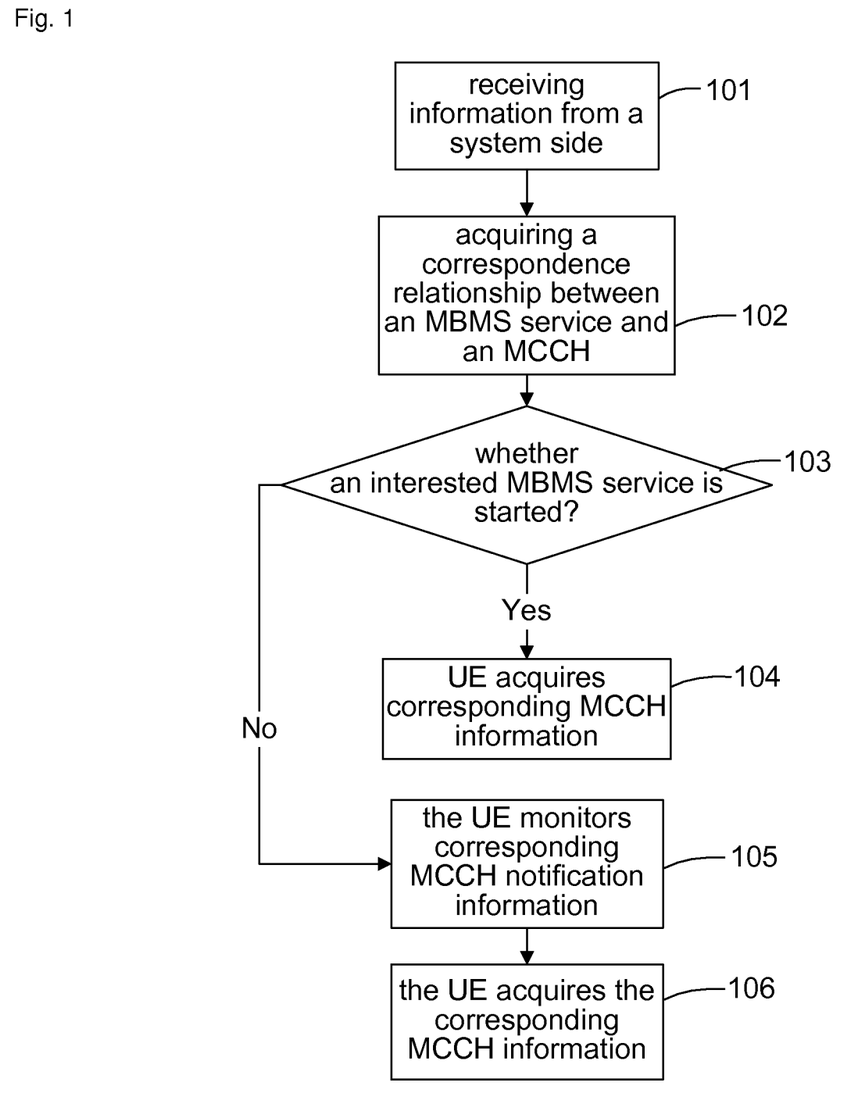
FIG. 1 shows a flowchart of a method for acquiring control channel information of an MBMS according to Embodiment one of the disclosure.

An application scenario of the example is that: more than two MCCHs exist in an MBSFN area, UE does not receive any MBMS service currently, the MBMS service that the UE expects to receive exists in the MBSFN area, the UE knows a correspondence relationship between the MBMS service expected to be received and an MCCH; as shown in FIG. 1, the method for acquiring control channel information of an MBMS according to the example includes the following steps.

Step 101: UE receives a message related to an MBMS service;

the message related to the MBMS service might be one or more of following messages: ESG, MCCH information, a short message, a multimedia short message, a system message and a RRC message; the message above related to the MBMS service can be either received periodically or received in real time according to a signaling indication; the information above may include but not limited to one or more of following contents: an MBMS service identifier in an area, a correspondence relationship between an MBMS service and an MCCH in an area, an MBMS service state in an area, start time of an MBMS service in an area, duration time of an MBMS service in an area, end time of an MBMS service in an area, priority information of an MBMS service in an area, charging information of an MBMS service in an area, classification information of an MBMS service in an area and the like.

Step 102: the UE obtains the correspondence relationship between the MBMS service and the MCCH;

the correspondence relationship between the MBMS service and the MCCH might be that one MBMS service corresponds to multiple MCCHs, or that one MCCH corresponds to multiple MBMS services.

Step 103: the UE determines whether the MBMS service interested is started, if yes, Step 104 is executed, otherwise, Step 105 is executed;

that the UE determines whether the MBMS service is started refers to that the UE determines whether the MBMS service is started according to the message related to the MBMS service.

Step 104: the UE acquires MCCH information corresponding to the MBMS service interested;

that the UE acquires MCCH information refers to that the UE acquires MCCH information on a corresponding MBSFN subframe according to a system message indication; the MCCH information contains specific configuration information of the MBMS service.

Step 105: the UE monitors MCCH notification information corresponding to the MBMS service;

the UE determines the MCCH corresponding to the currently interested service according to the correspondence relationship between the MBMS service and the MCCH previously obtained, and monitors a notification message of the MCCH; that the UE monitors refers to that the UE detects MCCH notification information on a specified MBSFN subframe according to a system message indication and then the UE can determine a changed MCCH according to the MCCH notification information; the detecting MCCH notification information refers to blindly detecting DCI information and an M-RNTI value of an MCCH notification on a PDCCH; when it is determined that a DCI content of the MCCH notification information is changed, the MCCH corresponding to the MCCH notification information is changed.

Step 106: the UE further acquires MCCH information according to the MCCH notification information;

the further acquiring MCCH information refers to that the UE finds that the interested MCCH is changed according to the notification information and receives the MCCH information on the corresponding MBSFN subframe according to the system message indication; the MCCH information contains specific configuration information of the MBMS service according to which the UE receives the MBMS service interested.

EXAMPLE 2

Figure 2:
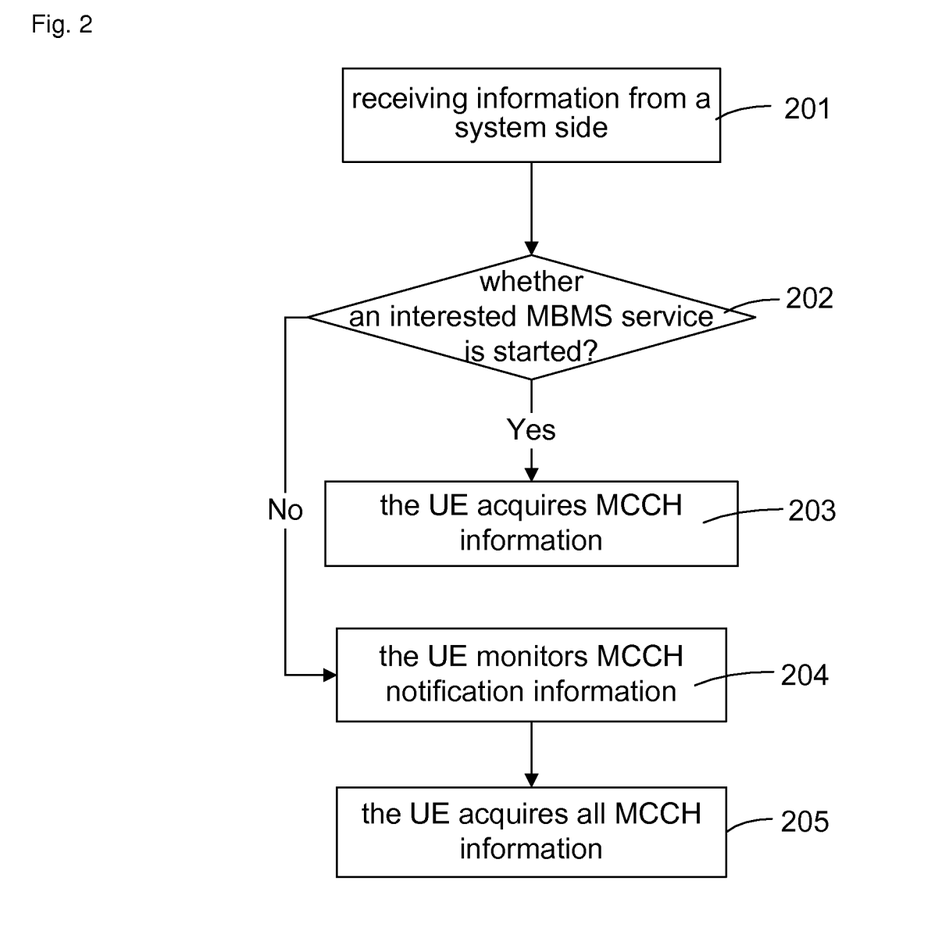
FIG. 2 shows a flowchart of a method for acquiring control channel information of an MBMS according to Embodiment two of the disclosure.

An application scenario of the example is that: more than two MCCHs exist in an MBSFN area, UE does not receive an MBMS service currently, the MBMS service that the UE expects to receive exists in the MBSFN area, the UE does not know a correspondence relationship between an MBMS service, which the UE expects to receive, and an MCCH; as shown in FIG. 2, the method for acquiring control channel information of an MBMS according to the example includes the following steps.

Step 201: UE receives a message related to an MBMS service;

the step is the same as Step 101 above.

Step 202: the UE determines whether the MBMS service interested is started, if yes, Step 203 is executed, otherwise, Step 204 is executed;

Step 203: the UE acquires all MCCH information in the area;

since the UE dose not acquire the correspondence relationship between the MBMS service interested and the MCCH, the UE needs to acquire all MCCH information in the area;

that the UE acquires all MCCH information refers to that the UE receives MCCH information on a corresponding MBSFN subframe according to a system message indication; the MCCH information contains configuration information of the MBMS service.

Step 204: the UE monitors all MCCH notification information in the area;

since the UE dose not acquire the correspondence relationship between the MBMS service interested and the MCCH, the UE needs to monitor all the MCCH notification information in the area;

the UE detects MCCH notification information on a specified MBSFN subframe according to a system message indication, then the UE can judge a changed MCCH according to the MCCH notification information; the detecting MCCH notification information refers to blindly detecting DCI information and an M-RNTI value of an MCCH notification on a PDCCH; when it is determined that a DCI content of the MCCH notification information is changed, the MCCH corresponding to the MCCH notification information is changed.

Step 205: the UE further acquires MCCH information according to the MCCH notification information;

the further acquiring MCCH information refers to that the UE finds that an MCCH is changed in the area according to the notification information and receives the MCCH information on the corresponding MBSFN subframe according to the system message indication; the acquiring MCCH means acquiring all changed MCCH in the area; the MCCH information contains configuration information of an MBMS service; information related to the MBMS service interested is determined and found according to information of all the changed MCCH, and then the MBMS service interested is received.

EXAMPLE 3

Figure 3:
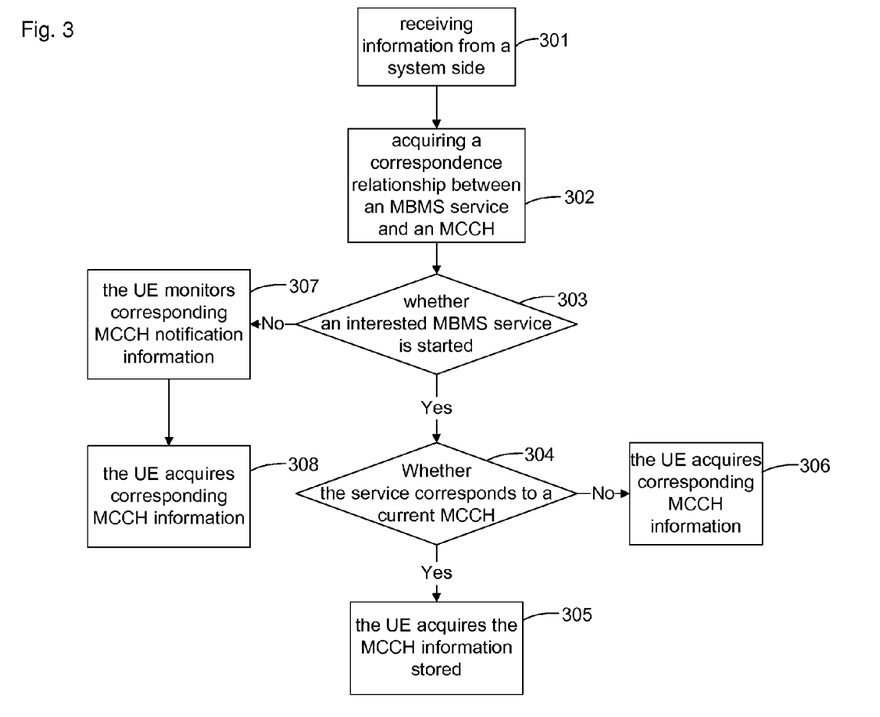
FIG. 3 shows a flowchart of a method for acquiring control channel information of an MBMS according to Embodiment three of the disclosure.

An application scenario of the example is that: more than two MCCHs exist in an MBSFN area, UE is receiving an MBMS service, in the area there are other MBMS service that the UE expects to receive, the UE knows a correspondence relationship between an MBMS service and an MCCH; as shown in FIG. 3, the method for acquiring control channel information of an MBMS according to the example includes the following steps.

Step 301: UE receives a message related to an MBMS service;

the step is the same as Step 101 above.

Step 302: the UE obtains the correspondence relationship between the MBMS service and the MCCH;

the step is the same as Step 102 above.

Step 303: the UE further expects to access to other MBMS service, and further determines whether the MBMS service interested is started, if yes, Step 304 is executed, otherwise, Step 307 is executed;

the other MBM service refer to an MBMS service interested by the UE other than the MBMS service that the UE is receiving; that the UE determines whether the MBMS service interested is started refers to that the UE determines whether the MBMS service is started according to an existing message related to the MBMS service.

Step 304: the UE determines whether an MCCH corresponding to the MBMS service interested is an MCCH corresponding to the MBMS service that the US is receiving, if yes, Step 305 is executed, otherwise, Step 306 is executed.

Step 305: the UE acquires stored MCCH information;

the stored MCCH information refers to all information related to the MBMS service in the MCCH corresponding to the MBMS service that the UE is receiving; the stored MCCH information above refers to local MCCH information stored in the UE during the same MCCH modification period.

Step 306: the UE acquires the MCCH information corresponding to the MBMS service interested;

the UE determines the MCCH corresponding to the MBMS service interested according to the correspondence relationship between the MBMS service and the MCCH.

Step 307: the UE monitors MCCH notification information corresponding to the MBMS service;

that the UE monitors refers to that the UE detects MCCH notification information on a specified MBSFN subframe according to a system message indication and then the UE can determine a changed MCCH according to the MCCH notification information; the detecting MCCH notification information refers to blindly detecting DCI information and an M-RNTI value of an MCCH notification on a PDCCH; when it is determined that a DCI content of the MCCH notification information is changed, the MCCH corresponding to the MCCH notification information is changed.

Step 308: the UE further acquires MCCH information according to the MCCH notification information;

the further acquiring MCCH information refers to that the UE finds that the interested MCCH is changed according to the notification information and receives the MCCH information on the corresponding MBSFN subframe according to the system message indication; the MCCH information contains specific configuration information of the MBMS service according to which the UE receives the MBMS service interested.

EXAMPLE 4

Figure 4:
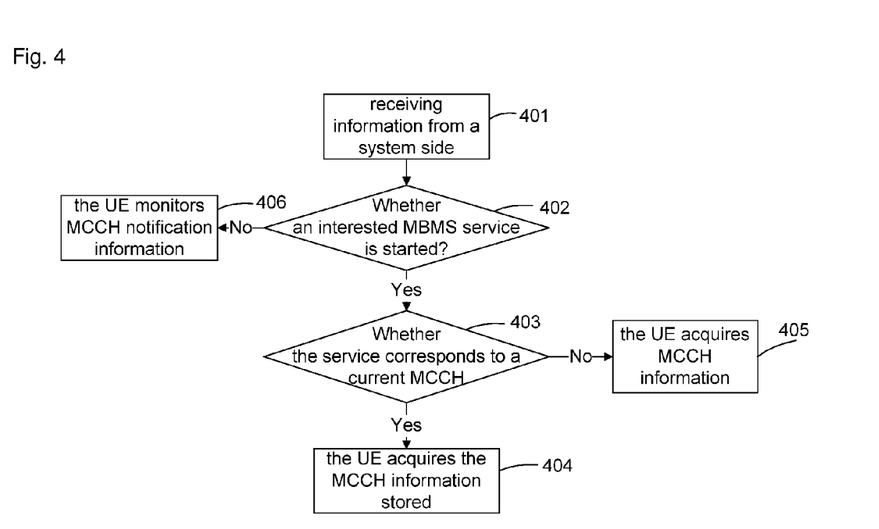
FIG. 4 shows a flowchart of a method for acquiring control channel information of an MBMS according to Embodiment four of the disclosure.

An application scenario of the example is that: more than two MCCHs exist in an MBSFN area, UE is receiving an MBMS service, in the area there are other MBMS service that the UE expects to receive, the UE does not know a correspondence relationship between an MBMS service and an MCCH; as shown in FIG. 4, the method for acquiring control channel information of an MBMS according to the example includes the following steps.

Step 401: UE receives a message related to an MBMS service;

this step is the same as Step 101 above.

Step 402: the UE determines whether the MBMS service interested is started, if yes, Step 403 is executed, otherwise, Step 406 is executed;

that the UE determines whether the MBMS service interested is started is that the UE determines whether the MBMS service interested is started according to an existing message related to the MBMS service.

Step 403: the UE determines whether an MCCH corresponding to the MBMS service interested is an MCCH corresponding to the MBMS service that the US is receiving, if yes, Step 404 is executed, otherwise, Step 405 is executed.

Step 404: the UE acquires stored MCCH information;

the stored MCCH information refers to the MCCH corresponding to the MBMS service that the UE is acquiring; the stored MCCH information above refers to local MCCH information stored in the UE during the same MCCH modification period.

Step 405: the UE acquires other MCCH information;

the other MCCH refer to an MCCH other than the MCCH corresponding to the MBMS service that the UE is acquiring.

Step 406: the UE monitors all MCCH notification information;

that the UE monitors refers to that the UE detects MCCH notification information on a specified MBSFN subframe according to a system message indication and then the UE can determine a changed MCCH according to the MCCH notification information; the detecting MCCH notification information refers to blindly detecting DCI information and an M-RNTI value of an MCCH notification on a PDCCH; when it is determined that a DCI content of the MCCH notification information is changed, the MCCH corresponding to the MCCH notification information is changed.

Step 407: the UE further acquires MCCH information according to the MCCH notification information;

the further acquiring MCCH information refers to that the UE finds that an MCCH is changed according to the notification information and receives the MCCH information on the corresponding MBSFN subframe according to the system message indication; the MCCH information contains specific configuration information of the MBMS service.

To facilitate understanding of the flows in the embodiments above, application examples will be provided hereinafter.

Figure 5:
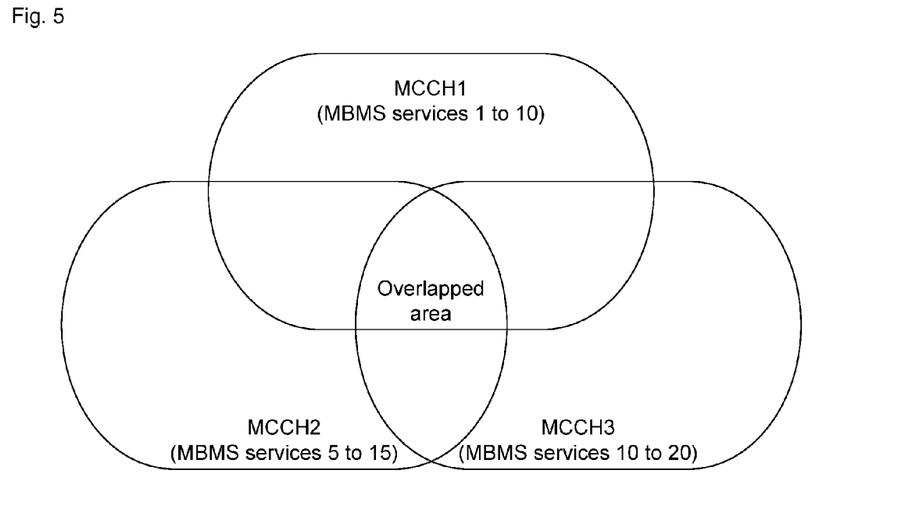
FIG. 5 shows a schematic diagram of an example of a specific application of the disclosure.

FIG. 5 shows a schematic diagram of an example of a specific application of the disclosure; it is assumed that there are three overlapped MBSFN areas respectively corresponding to an MCCH1, an MCCH2 and an MCCH3, wherein the MCCH1 corresponds to MBMS services 1 to 10; the MCCH2 corresponds to MBMS services 5 to 15; the MCCH3 corresponds to MBMS services 10 to 20.

Corresponding to Embodiment 1, it is assumed that UE having a capability of acquiring an MBMS service enters into an area, the UE knows that MBMS services the area can provide are MBMS services 1 to 20 and knows the MCCH corresponding to each MBMS service, the UE expects to receive the MBMS service 1 which corresponds to the MCCH1, if the MBMS service 1 is started, the UE receives MCCH1 information, if the MBMS service 1 is not started, the UE monitors notification information of the MCCH1.

Corresponding to Embodiment 2, it is assumed that UE having a capability of acquiring an MBMS service enters into an area, the UE knows that MBMS services the area can provide are MBMS services 1 to 20 but does not know the MCCH corresponding to each MBMS service, the UE expects to receive the MBMS service 1, if the MBMS service 1 is started, the UE receives MCCH information in the region, if the MBMS service 1 is not started, the UE monitors MCCH notification information in the area. In the area, corresponding MCCH notification information is triggered to be sent when any MBMS service is ready to be started, when monitoring the MCCH notification information, the UE continues to acquire the MCCH information during the next MCCH modification period so as to acquire configuration information of an MBMS service.

Corresponding to Embodiment 3, provided an UE having a capability of acquiring an MBMS service enters into an area, the UE knows that MBMS services the area can provide are MBMS services 1 to 20 and knows the MCCH corresponding to each MBMS service, the UE is acquiring the MBMS service 1, if the UE further expects to receive the MBMS service 2, since the MBMS services 1 and 2 both correspond to the MCCH1, the UE will acquire the MCCH1 periodically during the process of acquiring the MBMS service 1, then the UE acquires MCCH1 information stored locally; if the UE further expects to receive the MBMS service 16, since the MBMS service 16 corresponds to the MCCH3, if the MBMS service 16 is started, then the UE receives MCCH3 information; if the MBMS service 16 is not started, the UE monitors notification information of the MCCH3; when the MBMS service 16 is ready to be started, a system side sends notification information on a notification occasion; then the UE detects the notification information of the MCCH3 and acquires the MCCH3 information in the next MCCH3 modification period to obtain information related to the MBMS service 16.

Corresponding to Embodiment 4, provided an UE having a capability of acquiring an MBMS service enters into an area, the UE knows that MBMS services the area can provide are MBMS services 1 to 20 but does not know the MCCH corresponding to each MBMS service, the UE is acquiring the MBMS service 1, if the UE further expects to receive the MBMS service 2, if the MBMS service 2 is started before the MBMS service 1 is ended, since the UE knows that the MBMS service 2 corresponds to the MCCH1 according to MCCH1 information, the UE acquires the MCCH1 information stored locally; if the MBMS service 2 is not started before the MBMS service 1 is ended, the UE monitors all MCCH notification information; if the UE further expects to the MBMS service 12, since the UE does not find configuration information of the MBMS service 12 in the MCCH1, the UE does not know the MCCH corresponding to the service 12; if the MBMS service 12 is started, then the UE receives MCCH information in the area; if the MBMS service 12 is not started, then the UE monitors MCCH notification information in the area. In the area, corresponding MCCH notification information is triggered to be sent when any MBMS service is ready to be started, when monitoring MCCH notification information, the UE continues to acquire the MCCH information during the next MCCH modification period so as to acquire configuration information an MBMS service.

Figure 6:
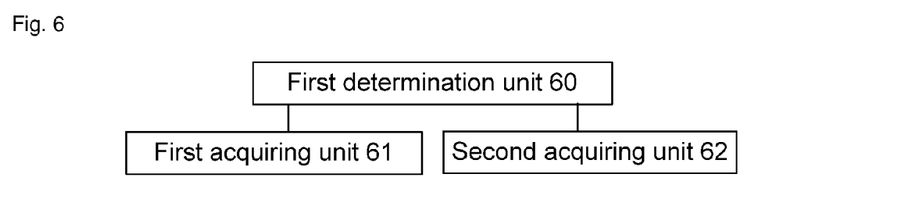
FIG. 6 shows a schematic diagram of the first structure composition of an apparatus for acquiring control channel information of an MBMS according to the disclosure.

FIG. 6 shows a schematic diagram of the first structure composition of an apparatus for acquiring control channel information of an MBMS according to the disclosure; as shown in FIG. 6, the apparatus for acquiring control channel information of an MBMS according to the example includes a first determination unit 60, a first acquiring unit 61 and a second acquiring unit 62, wherein the first determination unit 60 is configured to, in an MBSFN area which includes more than two MCCHs, when determining that an MBMS service interested by UE is not started, further determining whether a correspondence relationship between the interested MBMS service and the MCCHs exists, and trigger the first acquiring unit 61 when the correspondence relationship exists, otherwise, trigger the second acquiring unit 62;

the first acquiring unit 61 is configured to only acquire MCCH information corresponding to the interested MBMS service; and the second acquiring unit 62 is configured to acquire all MCCH information in the MBSFN area.

Figure 7:
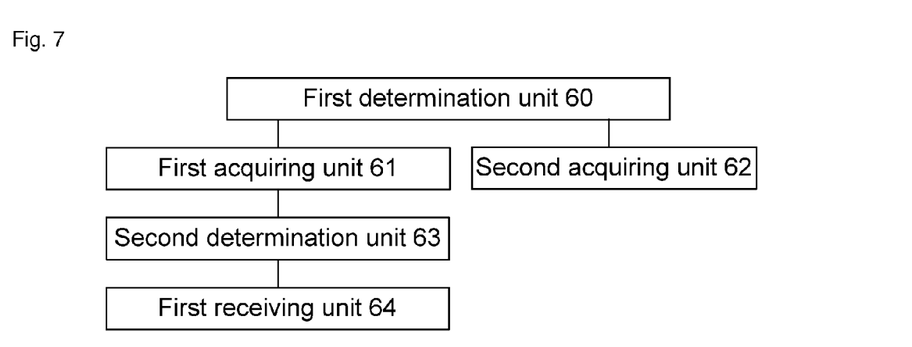
FIG. 7 shows a schematic diagram of the second structure composition of an is apparatus for acquiring control channel information of an MBMS according to the disclosure.

FIG. 7 a schematic diagram of the second structure composition of an apparatus for acquiring control channel information of an MBMS according to the disclosure; as shown in FIG. 7, based on the apparatus shown in FIG. 6, the apparatus for acquiring control channel information of an MBMS according to the example further includes a second determination unit 63 and a first receiving unit 64, wherein the second determination unit 63 is configured to determine play information of the interested MBMS service according to the MCCH information corresponding to the interested MBMS service acquired by the first acquiring unit 61; here, the play information includes MTCH information bearing the interested MBMS service and the like; and the first receiving unit 64 is configured to receive the interested MBMS service according to the play information.

Figure 8:
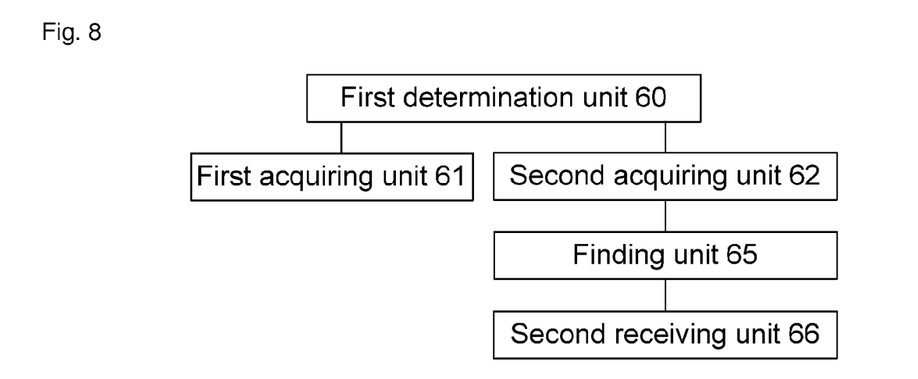
FIG. 8 shows a schematic diagram of the third structure composition of an apparatus for acquiring control channel information of an MBMS according to the disclosure.

FIG. 8 a schematic diagram of the third structure composition of an apparatus for acquiring control channel information of an MBMS according to the disclosure; as shown in FIG. 8, based on the apparatus shown in FIG. 6 or FIG. 7 (what shown in the FIG. 8 is based on the apparatus shown in FIG. 6), the apparatus for acquiring control channel information of an MBMS according to the example further includes a finding unit 65 and a receiving unit 66, wherein the finding unit 65 is configured to find out the play information of the interested MBMS service according to all the MCCH information acquired by the second acquiring unit; and the second receiving unit 66 is configured to receive the interested MBMS service according to the play information.

In the device examples above, the MBSFN area includes more than two MCCHs, that is, the MBSFN area is located in an area where more than two MBSFN areas are overlapped.

The first determination unit 60 is configured to acquire a correspondence relationship between an MBMS service and an MCCH according to at least one of ESG, MCCH information, a short message, a multimedia short message, a system message, RRC information and MCCH notification information received by the UE, and further to determine whether the interested MBMS service has a corresponding MCCH.

Those skilled in the art should understand that, an implementation function of each processing unit in the apparatus for acquiring control channel information of an MBMS as shown in FIG. 6, FIG. 7 and FIG. 8 can be understood with reference to related description of the forementioned Embodiments 1 to 4; a function of each unit in the apparatus for acquiring control channel information of an MBMS as shown in FIG. 6, FIG. 7 and FIG. 8 can be realized either by a program running on a processor or by a specific logical circuit.

UE having a capability of acquiring MBMS information includes the apparatus for acquiring control channel information of an MBMS as shown in forementioned FIG. 6, FIG. 7 and FIG. 8.

The above are the preferred embodiments of the disclosure only, and are not intended to limit the scope of protection of the disclosure.

The invention claimed is:

1. A method for acquiring Multicast Control Channel (MCCH) information, comprising:
   in an overlapping area of two or more Multimedia Broadcast Single Frequency Network (MBSFN) areas each of which corresponds to one MCCH, when User Equipment (UE) detects that an interested MBMS service has been started, determining by the UE whether a correspondence relationship between the interested MBMS service and an MCCH exists, and only acquiring by the UE MCCH information corresponding to the interested Multimedia Broadcast Multicast Service (MBMS) service when the correspondence relationship exists, otherwise, acquiring by the UE all MCCHs' information in the overlapped area.

2. The method according to claim 1, further comprising:
   determining, by the UE, configuration information of the interested MBMS service according to the acquired MCCH information corresponding to the interested MBMS service, and receiving by the UE the interested MBMS service according to the configuration information when the UE determines that a correspondence relationship between the interested MBMS service and the MCCH exists.

3. The method according to claim 1, further comprising:
   finding out, by the UE, configuration information of the interested MBMS service according to all the acquiring MCCHs' information, and receiving by the UE the interested MBMS service according to the configuration information, when the UE determines that a correspondence relationship between the interested MBMS service and the MCCH does not exist.

4. The method according to claim 1, wherein the determining by the UE whether a correspondence relationship between the interested MBMS service and the MCCH exists is:
   acquiring by the UE a correspondence relationship between an MBMS service and an MCCH according to at least one of received Electronic Service Navigation (ESG), MCCH information, a short message, a multimedia short message, a system message, Radio Resource Control (RRC) information and MCCH notification information, and further determining by the UE whether the interested MBMS service has a corresponding MCCH.

5. The method according to claim 1, wherein the UE is UE in RRC_IDLE state or RRC_CONNECTED state; and the UE is UE which is receiving an MBMS service or is interested in receiving an MBMS service.

6. An apparatus for acquiring Multicast Control Channel (MCCH) information, comprising: a first determination unit, a first acquiring unit and a second acquiring unit, wherein
the first determination unit is configured to, in an overlapping area of two or more Multimedia Broadcast Single Frequency Network (MBSFN) areas each of which corresponds to one MCCH when detecting that an MBMS service interested by User Equipment (UE) has been started, determine whether a correspondence relationship between the interested Multimedia Broadcast Multicast Service (MBMS) service and an MCCH exists, and trigger the first acquiring unit when the correspondence relationship exists, otherwise, trigger the second acquiring unit;
the first acquiring unit is configured to only acquire MCCH information corresponding to the interested MBMS service; and
the second acquiring unit is configured to acquire all MCCHs' information in the overlapped area.

7. The apparatus according to claim 6, further comprising a second determination unit and a first receiving unit, wherein
the second determination unit is configured to determine configuration information of the interested MBMS service according to the MCCH information corresponding to the interested MBMS service acquired by the first acquiring unit; and
the first receiving unit is configured to receive the interested MBMS service according to the configuration information.

8. The apparatus according to claim 6, further comprising a finding unit and a second receiving unit, wherein
the finding unit is configured to find out configuration information of the interested MBMS service according to all the MCCHs' information acquired by the second acquiring unit; and
the second receiving unit is configured to receive the interested MBMS service according to the configuration information.

9. The apparatus according to claim 6, wherein the first determination unit is configured to acquire a correspondence relationship between an MBMS service and an MCCH according to at least one of Electronic Service Navigation (ESG), MCCH information, a short message, a multimedia short message, a system message, Radio Resource Control (RRC) information and MCCH notification information received by the UE, and further to determine whether the interested MBMS service has a corresponding MCCH.

10. An User Equipment (UE) UE having a capability of receiving Multimedia Broadcast Multicast Service (MBMS) information, comprising: an apparatus for acquiring Multicast Control Channel (MCCH) information, wherein the apparatus comprises a first determination unit, a first acquiring unit and a second acquiring unit, wherein the first determination unit is configured to, in an overlapping area of two or more Multimedia Broadcast Single Frequency Network (MBSFN) areas each of which corresponds to one MCCH, when detecting that an MBMS service interested by UE has been started, determine whether a correspondence relationship between the interested Multimedia Broadcast Multicast Service (MBMS) service and an MCCH exists, and trigger the first acquiring unit when the correspondence relationship exists, otherwise, trigger the second acquiring unit;
the first acquiring unit is configured to only acquire MCCH information corresponding to the interested MBMS service; and
the second acquiring unit is configured to acquire all MCCHs' information in the overlapping area.

* * * * *